United States Patent
Hu et al.

(10) Patent No.: US 11,954,638 B2
(45) Date of Patent: Apr. 9, 2024

(54) GOODS PICKING TASK ALLOCATION METHOD AND DEVICE

(71) Applicant: CAINIAO SMART LOGISTICS HOLDING LIMITED, Grand Cayman (KY)

(72) Inventors: Haoyuan Hu, Hangzhou (CN); Longfei Wang, Hangzhou (CN)

(73) Assignee: CAINIAO SMART LOGISTICS HOLDING LIMITED, George Town (KY)

( * ) Notice: Subject to any disclaimer, the term of this patent is extended or adjusted under 35 U.S.C. 154(b) by 737 days.

(21) Appl. No.: 16/951,804

(22) Filed: Nov. 18, 2020

(65) Prior Publication Data
US 2021/0073722 A1    Mar. 11, 2021

Related U.S. Application Data

(63) Continuation of application No. PCT/CN2019/087167, filed on May 16, 2019.

(30) Foreign Application Priority Data

May 24, 2018    (CN) .......................... 201810508109.9

(51) Int. Cl.
G06Q 10/087    (2023.01)
G05B 19/4155    (2006.01)
(Continued)

(52) U.S. Cl.
CPC ....... *G06Q 10/087* (2013.01); *G05B 19/4155* (2013.01); *G06Q 10/06316* (2013.01);
(Continued)

(58) Field of Classification Search
CPC ........... G06Q 10/087; G06Q 10/06316; G06Q 10/08; G05B 19/4155; G05B 2219/32392
(Continued)

(56) References Cited

U.S. PATENT DOCUMENTS 7,904,191 B2    3/2011    Rossi et al.
8,335,585 B2    12/2012   Hansl
(Continued)

FOREIGN PATENT DOCUMENTS

CN    1393809 A    1/2003
CN    102602646 A   7/2012
(Continued)

OTHER PUBLICATIONS

PCT International Search Report and the Written Opinion dated Jul. 30, 2019, issued in related International Application No. PCT/CN2019/087167, with partial English translation (9 pages).
(Continued)

*Primary Examiner* — Jacob S. Scott
*Assistant Examiner* — Michael E Butler (57) ABSTRACT

A task allocation method and apparatus are provided. The method includes: receiving orders of merchandises stored on shelves; determining a merchandise picking time of each merchandise of the received orders; determining an order picking time for each received order according to the merchandise picking time of each merchandise; determining an order set according to the order picking time for each received order, and selecting orders from the order set as target orders; locating shelves on which merchandises in the target orders are stored; obtaining merchandise status of the merchandises in the target orders, and determining a target shelf according to the merchandise status; allocating, a picking task of the merchandises to the target shelf; determining a picking workstation corresponding to the target shelf; instructing the target shelf to move to the picking workstation to execute the picking task, and to leave the picking workstation after the picking task is completed.

19 Claims, 3 Drawing Sheets

(51) Int. Cl.
    *G06Q 10/0631*     (2023.01)
    *G06Q 10/08*     (2023.01)
    *B65G 1/137*     (2006.01)

(52) U.S. Cl.
    CPC ........... *G06Q 10/08* (2013.01); *B65G 1/1378* (2013.01); *G05B 2219/32392* (2013.01)

(58) Field of Classification Search
    USPC .......................................................... 700/216
    See application file for complete search history.

(56) References Cited

U.S. PATENT DOCUMENTS

| | | | |
|---|---|---|---|
| 8,571,915 | B1* | 10/2013 | Wong .................... G06Q 10/06 705/7.26 |
| 9,205,982 | B2 | 12/2015 | Winkler |
| 9,286,590 | B2 | 3/2016 | Segawa et al. |
| 2008/0270327 | A1 | 10/2008 | Freudelsperger |
| 2018/0082353 | A1 | 3/2018 | Mattingly et al. |
| 2018/0096299 | A1 | 4/2018 | Jarvis et al. |
| 2020/0311644 | A1* | 10/2020 | Willard, III ........ G06Q 30/0601 |

FOREIGN PATENT DOCUMENTS

| | | |
|---|---|---|
| CN | 102844251 A | 12/2012 |
| CN | 102982432 A | 3/2013 |
| CN | 106185152 A | 12/2016 |
| CN | 106311615 A | 1/2017 |
| CN | 106709692 A | 5/2017 |
| CN | 106809586 A | 6/2017 |
| CN | 107215520 A | 9/2017 |
| CN | 107274246 A | 10/2017 |
| CN | 107555056 A | 1/2018 |
| CN | 207346530 U | 5/2018 |
| CN | 108415430 A | 8/2018 |
| CN | 108584274 A | 9/2018 |
| CN | 108712989 B | 10/2018 |
| DE | 102011104511 B3 | 10/2012 |
| DE | 102013108934 A1 | 2/2015 |
| EP | 1659077 A2 | 5/2006 |
| EP | 1570324 B1 | 2/2009 |
| EP | 3468899 A1 | 4/2019 |
| EP | 3719724 A1 | 10/2020 |
| KR | 10-2013-0139353 A | 12/2013 |
| KR | 10-2138177 B1 | 7/2020 |
| WO | 2006-029433 A1 | 3/2006 |

OTHER PUBLICATIONS

First Search for Chinese Application No. 201810508109.4 dated Dec. 27, 2022.

Search Report for Chinese Application No. 201810508109.4 dated Nov. 20, 2023.

* cited by examiner

GOODS PICKING TASK ALLOCATION METHOD AND DEVICE

CROSS-REFERENCE TO RELATED APPLICATIONS

This application is a continuation application of International Patent Application No. PCT/CN2019/087167, filed with the China National Intellectual Property Administration (CNIPA) on May 16, 2019 and entitled "GOODS PICKING TASK ALLOCATION METHOD AND DEVICE", which is based on and claims priority to and benefit of Chinese Patent Application No. 201810508109.4, filed with the CNIPA on May 24, 2018. The entire content of all of the above-identified applications is incorporated herein by reference.

TECHNICAL FIELD

This specification relates to the field of logistics technologies, and in particular, to a task allocation method for picking goods/merchandise and a task allocation apparatus for picking goods/merchandise.

BACKGROUND

In the field of e-commerce, quality and experience of logistics attract increasing attention of consumers. Logistics timeliness is usually a very important factor in logistics, which is affected by goods/merchandise transportation, management of a goods/merchandise warehouse, and improvement of efficiency for goods/merchandise in the warehouse.

Currently, with the development of automation technologies and intelligent control technologies, modern warehouse systems are gradually developed to be automatic and intelligent. Current mainstream automatic warehouse systems include an automatic stereoscopic warehouse, a mobile robot-based automatic warehouse, and the like. In addition, to reduce rental costs and improve warehouse space utilization, high-density automatic warehouse systems have been developed in recent years, which have advantages such as high storage capacity, safety, and stability. However, as shelves are closely arranged, a picking operation is inflexible. Therefore, it is necessary to design and implement an efficient order picking scheme for such systems to improve picking efficiency in warehouses.

SUMMARY

In view of the foregoing problem, embodiments of this specification provide a task allocation method and a corresponding task allocation apparatus for picking merchandises to overcome the foregoing problem or resolve the foregoing problem.

To resolve the foregoing problem, this specification discloses a task allocation method for picking merchandises, wherein the merchandises are stored on shelves of a warehouse. The method includes: determining a merchandise picking time of the merchandise in the warehouse; determining an order picking time of each order according to the merchandise picking time; determining a corresponding order set according to the order picking time, and selecting one or more orders from the order set as a target order; obtaining a merchandise status of merchandises in the target order, and determining a target shelf of the merchandises according to the merchandise status; and allocating a picking task of the merchandise to the target shelf.

In one embodiment, the determining a merchandise picking time of the merchandise in the warehouse includes: obtaining a moving speed of the shelf on which the merchandise is located and a picking speed of the merchandise; and determining the merchandise picking time of the merchandise according to the moving speed and the picking speed.

In one embodiment, the determining an order picking time of each order according to the merchandise picking time includes: obtaining merchandise picking times of merchandises in the order; comparing the merchandise picking times, and determining a latest merchandise picking time of the merchandise in the order; and using the latest merchandise picking time as the order picking time of the order.

In one embodiment, the obtaining merchandise picking times of merchandise in the order includes: obtaining, when the order includes merchandises stored on a plurality of shelves, a plurality of merchandise picking times of the merchandises; comparing the plurality of merchandise picking times of the merchandises, and determining an earliest merchandise picking time of the merchandises; and using the earliest merchandise picking time as the merchandise picking time of the merchandises.

In one embodiment, the obtaining merchandise picking times of merchandise in the order includes: obtaining, when the order includes merchandises stored on a plurality of shelves, a plurality of merchandise picking times of the merchandises; calculating an average merchandise picking time of the merchandises using the plurality of merchandise picking times of the merchandises; and using the average merchandise picking time as the merchandise picking time of the merchandises.

In one embodiment, the determining a corresponding order set according to the order picking time, and selecting one or more orders from the order set as a target order includes: obtaining an order available to be picked within a specified time range as a candidate order according to the order picking times; extending the specified time range when a quantity of candidate orders is less than a preset minimum order quantity, and obtaining, according to the order picking times, a target order available to be picked within the extended specified time range; selecting, when the quantity of candidate orders is greater than a preset maximum order quantity, one or more orders from the candidate orders as a target order; and selecting, when the quantity of candidate orders is greater than or equal to the preset minimum order quantity and less than or equal to the preset maximum order quantity, one or more orders from the candidate orders as a target order.

In one embodiment, the selecting one or more orders from the candidate orders as a target order includes: obtaining earliest merchandise picking times of merchandises in the candidate orders and latest picking times of merchandises in the candidate orders; calculating, according to a preset rule, order processing times using the earliest merchandise picking times and the latest picking times; ranking the order processing times of the candidate orders to obtain a ranking result; and selecting one or more orders from the candidate orders as a target order according to the ranking result.

In one embodiment, the obtaining merchandise status of merchandises in the target order, and determining a target shelf of the merchandises according to the merchandise status includes: when merchandises in the target order are stored on one shelf, using the one shelf as the target shelf of the merchandise.

In one embodiment, the obtaining merchandise status of merchandises in the target order, and determining a target shelf of the merchandises according to the merchandise status includes: obtaining a storage quantity of a merchandise in the target order on each shelf when the merchandise in the target order are stored on a plurality of shelves; counting a required picking quantity of the merchandise in the target order; using a shelf with a storage quantity greater than or equal to the required picking quantity as a candidate shelf; determining whether a picking task of the merchandise is allocated to the candidate shelf; if the picking task of the merchandise is allocated to the candidate shelf, determining whether there is only one candidate shelf allocated the picking task of the merchandise; if there is only one candidate shelf allocated the picking task of the merchandise, using the candidate shelf as the target shelf; if there are a plurality of candidate shelves allocated the picking task of the merchandise, determining whether other merchandises in the order in which the merchandise is located are allocated a picking task; if the other merchandises in the order in which the merchandise is located are allocated a picking task, collecting statistics on estimated picking times of the other merchandises; determining the target shelf from the candidate shelves according to the estimated picking times; and if the other merchandises in the order in which the merchandise is located are not allocated picking tasks, selecting a candidate shelf from which merchandises are picked at the earliest time as the target shelf.

In one embodiment, after the allocating a picking task of the merchandise to the target shelf, the method further includes: determining a corresponding picking workstation according to the target shelf allocated to the merchandise; and moving the target shelf to the corresponding picking workstation to execute the picking task of the merchandise.

The embodiments of this specification further disclose a task allocation apparatus for picking merchandises, wherein the merchandises are stored on shelves of a warehouse. The apparatus includes: a merchandise picking time determining module, configured to determine a merchandise picking time of the merchandise in the warehouse; an order picking time determining module, configured to determine an order picking time of each order according to the merchandise picking time; a target order obtaining module, configured to determine a corresponding order set according to the order picking times, and select one or more orders from the order set as a target order; a target shelf determining module, configured to obtain merchandise status of merchandises in the target order, and determine a target shelf of the merchandises according to the merchandise status; and a picking task allocation module, configured to allocate a picking task of the merchandises to the target shelf.

In one embodiment, the merchandise picking time determining module includes: a speed data obtaining submodule, configured to obtain a moving speed of the shelf on which the merchandise is located and a picking speed of the merchandise; and a merchandise picking time determining submodule, configured to determine the merchandise picking time of the merchandise according to the moving speed and the picking speed.

In one embodiment, the order picking time determining module includes: a merchandise picking time obtaining submodule, configured to obtain merchandise picking times of merchandises in the order; a merchandise picking time comparison submodule, configured to compare the merchandise picking times, and determine a latest merchandise picking time of the merchandises in the order; and an order picking time determining submodule, configured to use the latest merchandise picking time as the order picking time of the order.

In one embodiment, the merchandise picking time obtaining submodule includes: a unit for obtaining a plurality of merchandise picking times, configured to obtain, when the order includes merchandises stored on a plurality of shelves, a plurality of merchandise picking times of the merchandises; an earliest merchandise picking time screening unit, configured to compare the plurality of merchandise picking times of the merchandises, and determine an earliest merchandise picking time of the merchandises; and a merchandise picking time determining unit, configured to use the earliest merchandise picking time as the merchandise picking time of the merchandises.

In one embodiment, the merchandise picking time obtaining submodule includes: a unit for obtaining a plurality of merchandise picking times, configured to obtain, when the order includes merchandises stored on a plurality of shelves, a plurality of merchandise picking times of the merchandises; an average merchandise picking time calculation unit, configured to calculate an average merchandise picking time of the merchandises using the plurality of merchandise picking times of the merchandises; and a merchandise picking time determining unit, configured to use the average merchandise picking time as the merchandise picking time of the merchandises.

In one embodiment, the target order obtaining module includes: a candidate order obtaining submodule, configured to obtain an order available to be picked within a specified time range as a candidate order according to the order picking times; a first processing submodule, configured to extend the specified time range when a quantity of candidate orders is less than a preset minimum order quantity, and invoke the candidate order obtaining submodule with the extended specified time range; a second processing submodule, configured to select, when the quantity of candidate orders is greater than a preset maximum order quantity, one or more orders from the candidate orders as a target order; and a third processing submodule, configured to select, when the quantity of candidate orders is greater than or equal to the preset minimum order quantity and less than or equal to the preset maximum order quantity, one or more orders from the candidate orders as a target order.

In one embodiment, the second processing submodule includes: a picking time obtaining unit, configured to obtain earliest merchandise picking times of merchandises in the candidate orders and latest picking times of merchandises in the candidate orders; an order processing time calculation unit, configured to calculate, according to a preset rule, order processing times by using the earliest merchandise picking times and the latest picking times; a ranking unit, configured to rank the order processing times of the candidate orders to obtain a ranking result; and a target order screening unit, configured to select one or more orders from the candidate orders as a target order according to the ranking result.

In one embodiment, the target shelf determining module includes: a target obtaining determining submodule, configured to use, when merchandises in the target order are stored on one shelf, the one shelf as the target shelf of the merchandises.

In one embodiment, the target shelf determining module includes: a storage quantity obtaining submodule, configured to obtain a storage quantity of a merchandise in the candidate order on each shelf when the merchandise in the candidate order are stored on a plurality of shelves; a required picking quantity counting submodule, configured to count a required picking quantity of the merchandise in the candidate order; a candidate shelf determining submodule, configured to use a shelf with a storage quantity greater than or equal to the required picking quantity as a candidate shelf; a picking task judgment submodule, configured to determine whether a picking task of the merchandise is allocated to the candidate shelf; a candidate shelf quantity judgment submodule, configured to: if the picking task of the merchandise is allocated to the candidate shelf, determine whether there is only one candidate shelf allocated the picking task of the merchandises; a first target shelf determining submodule, configured to: if there is only one candidate shelf allocated the picking task of the merchandises, use the candidate shelf as the target shelf; a picking task judgment submodule, configured to: if there are a plurality of candidate shelves allocated the picking task of the merchandises, determine whether other merchandises in the order in which the merchandise is located are allocated a picking task; a submodule for collecting statistics on estimated picking times, configured to: if the other merchandises in the order in which the merchandise is located are allocated a picking task, collect statistics on estimated picking times of the other merchandises; a second target shelf determining submodule, configured to determine the target shelf from the candidate shelves according to the estimated picking times; and an earliest merchandise picking time screening submodule, configured to: if the other merchandises in the order in which the merchandise is located are not allocated picking tasks, select a candidate shelf from which merchandises are picked at the earliest time as the target shelf.

In one embodiment, the apparatus further includes: a picking workstation determining module, configured to determine a corresponding picking workstation according to the target shelf allocated to the merchandises; and a picking task execution module, configured to move the target shelf to the corresponding picking workstation to execute the picking task of the merchandises.

This specification further discloses a device, including one or more processors, and one or more machine-readable media storing instructions, when executed by the one or more processors, causing the device to perform the foregoing method.

This specification further discloses one or more machine-readable media, storing instructions, when executed by one or more processors, causing a device to perform the foregoing method.

In one further aspect, a task allocation method for picking merchandises is provided, wherein the merchandises are stored on shelves of a warehouse. The method comprises: receiving a plurality of orders of merchandises; determining a merchandise picking time of each merchandise of the merchandises of the received orders; determining an order picking time for each of the received orders according to the merchandise picking time of each of the merchandises; determining an order set according to the order picking time for each of the received orders, and selecting one or more orders from the order set as one or more target orders; locating one or more shelves on which merchandises in the one or more target orders are stored in the warehouse; obtaining merchandise status of the merchandises in the one or more target orders, and determining a target shelf according to the merchandise status; allocating a picking task of the merchandises to the target shelf; determining a picking workstation corresponding to the target shelf; instructing, when the picking workstation is available, the target shelf to move to the picking workstation to execute the picking task of the merchandises; and instructing the target shelf to leave the corresponding picking workstation after the picking task of the merchandise is completed.

In one embodiment, determining a merchandise picking time of each merchandise of the merchandises comprises: obtaining a moving speed of the shelf on which the merchandise is located and a picking speed of the merchandise; and calculating the merchandise picking time of the merchandise according to the moving speed of the shelf and the picking speed of the merchandise.

In one embodiment, determining an order picking time for each of the received orders according to the merchandise picking time of each of the merchandises comprises: obtaining merchandise picking times for merchandises in each order; comparing the obtained merchandise picking times; and determining a latest merchandise picking time of the merchandises in each order as the order picking time of each order.

In one embodiment, determining a merchandise picking time of each merchandise comprises: obtaining, when the merchandise is stored on a plurality of shelves, a plurality of merchandise picking times associated with the merchandise; and comparing the plurality of merchandise picking times; and determining an earliest merchandise picking time associated with the merchandise as the merchandise picking time of the merchandise.

In one embodiment, determining a merchandise picking time of each merchandise comprises: obtaining, when the merchandise is stored on a plurality of shelves, a plurality of merchandise picking times associated with the merchandise; calculating an average merchandise picking time of the merchandise using the plurality of merchandise picking times; and using the average merchandise picking time as the merchandise picking time of the merchandise.

In one embodiment, determining an order set according to the order picking time for each of the received orders, and selecting one or more orders from the order set as one or more target orders comprise: obtaining a plurality of orders that are available for picking within a first time range as candidate orders; extending the first time range to a second time range when a quantity of the candidate orders is less than a minimum order quantity, and obtaining a plurality of orders that are available for picking within the second time range as the candidate orders; and selecting, when the quantity of candidate orders is greater than or equal to the minimum order quantity, one or more orders from the candidate orders as the one or more target orders.

In one embodiment, selecting one or more orders from the candidate orders as the one or more target orders comprises: obtaining an earliest merchandise picking time of merchandises in each of the candidate orders and a latest picking merchandise time of merchandises in each of the candidate orders; calculating, according to a rule, order processing times of the candidate orders according to the earliest merchandise picking time and the latest picking time of each of the candidate orders; ranking the order processing times of the candidate orders to obtain a ranking result; and selecting one or more orders from the candidate orders as the one or more target order according to the ranking result.

In one embodiment, obtaining merchandise status of the merchandises in the one or more target orders, and determining a target shelf according to the merchandise status comprise: determining, when the merchandises in the one or more target orders are stored on a same shelf, the same shelf as the target shelf.

In one embodiment, obtaining merchandise status of the merchandises in the one or more target orders, and determining a target shelf according to the merchandise status comprises: obtaining a storage quantity of a first merchandise in the one or more target orders on each shelf when the first merchandise is stored on a plurality of shelves; counting a required quantity of the first merchandise in the one or more target orders; using a plurality of shelves having a storage quantity of the first merchandise that is greater than or equal to the required quantity as candidate shelves; determining whether each of the candidate shelves has been allocated a picking task of the first merchandise; if the picking task of the first merchandise is allocated to at least one of the candidate shelves, determining whether only one of the candidate shelves is allocated the picking task of the first merchandise; if only one of the candidate shelves is allocated the picking task of the first merchandise, determining the one candidate shelf as the target shelf; if more than one of the candidate shelves are each allocated a picking task of the first merchandise, determining whether one or more other merchandises in the one or more target orders are allocated to one or more picking tasks; if a second merchandise of the other merchandises is allocated to a picking task, calculating an estimated picking time of the second merchandise; determining the target shelf from the candidate shelves according to the estimated picking time; and if the other merchandises are not allocated to one or more picking tasks, selecting a candidate shelf on which the first merchandise has an earliest merchandise picking time as the target shelf.

In another further aspect, a task allocation apparatus for picking merchandises is provided, wherein the merchandises are stored on shelves of a warehouse. The apparatus comprises one or more processors and one or more machine-readable media storing instructions, when executed by the one or more processors, causing the apparatus to perform operations comprise: receiving a plurality of orders of merchandises; determining a merchandise picking time of each merchandise of the merchandises of the received orders; determining an order picking time for each of the received orders according to the merchandise picking time of each of the merchandises; determining an order set according to the order picking time for each of the received orders, and selecting one or more orders from the order set as one or more target orders; locating one or more shelves on which merchandises in the one or more target orders are stored in the warehouse; obtaining merchandise status of the merchandises in the one or more target orders, and determining a target shelf according to the merchandise status; allocating a picking task of the merchandises to the target shelf; determining a picking workstation corresponding to the target shelf; instructing, when the picking workstation is available, the target shelf to move to the picking workstation to execute the picking task of the merchandises; and instructing the target shelf to leave the corresponding picking workstation after the picking task of the merchandise is completed.

In another further aspect, a non-transitory computer-readable storage medium for task allocation for picking merchandises, configured with instructions when executed by one or more processors to cause the one or more processors to perform operations comprise: receiving a plurality of orders of merchandises; determining a merchandise picking time of each merchandise of the merchandises of the received orders; determining an order picking time for each of the received orders according to the merchandise picking time of each of the merchandises; determining an order set according to the order picking time for each of the received orders, and selecting one or more orders from the order set as one or more target orders; locating one or more shelves on which merchandises in the one or more target orders are stored in the warehouse; obtaining merchandise status of the merchandises in the one or more target orders, and determining a target shelf according to the merchandise status; allocating a picking task of the merchandises to the target shelf; determining a picking workstation corresponding to the target shelf; instructing, when the picking workstation is available, the target shelf to move to the picking workstation to execute the picking task of the merchandises; and instructing the target shelf to leave the corresponding picking workstation after the picking task of the merchandise is completed.

The embodiments of this specification have the following advantages.

In the embodiments of this specification, merchandise picking times of merchandises are determined in a warehouse, a target order that can be processed is determined based on the merchandise picking times, and then a picking task of merchandises in the target order is allocated to corresponding shelves according to merchandise status of the merchandises. In the embodiments of this specification, a proper shelf can be allocated according to the merchandise status of the merchandises, to improve order picking efficiency.

DETAILED DESCRIPTION OF THE INVENTION

To enable the foregoing objective, characteristic, and advantage of this specification to be clearer and easier to understand, the following further describes this specification in detail with reference to accompanying drawings and specific implementations.

Figure 1:
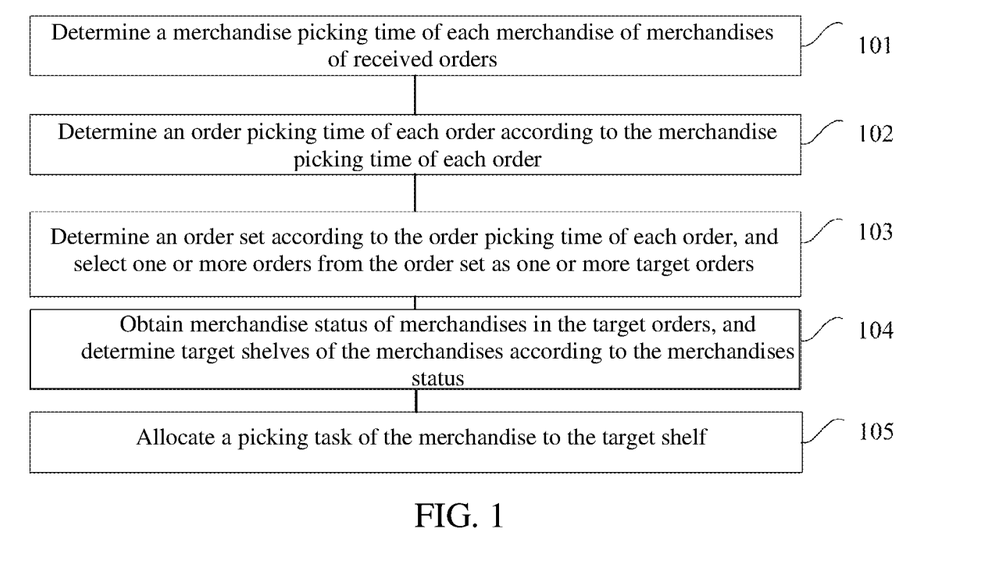
FIG. 1 is a flowchart of a task allocation method for picking merchandises, according to some embodiments of this specification.

FIG. 1 is a flowchart of a task allocation method for picking merchandises, according to an embodiment of this specification. The method may include the following steps.

Step 101, determine a merchandise picking time of each merchandise of merchandises of received orders.

This embodiment of this specification may be applied to an automatic high-density warehouse. The automatic high-density warehouse refers to an automatic warehousing system in which shelves are arranged close to each other and merchandise are stored on and picked from the shelves.

Figure 2:
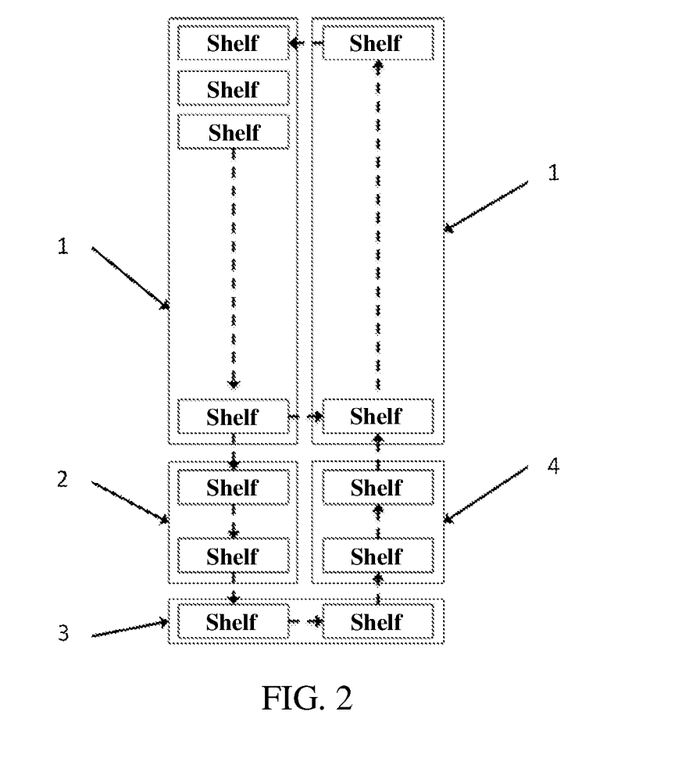
FIG. 2 is a schematic diagram of a part of an automatic high-density warehouse, according to some embodiments of this specification.

FIG. 2 is a schematic diagram of a part of an automatic high-density warehouse, according to an embodiment of this specification. The automatic high-density warehouse includes four areas: a movement area 1, a picking waiting area 2, a picking workstation 3, and a returning waiting area 4. In this part, shelves are arranged close to each other in a specific area. During a picking operation, shelves move in a fixed direction and at a fixed speed. To be specific, shelves on a left pathway in the movement area move in a direction towards the picking waiting area. If there is to-be-picked merchandise on a shelf, the shelf enters the picking waiting area waiting for picking. Otherwise, the shelf laterally moves to the right to a right pathway in the movement area, and then moves in a direction away from the returning waiting area. When moving to the position at an upper end of the movement area, the shelf laterally moves to the left to the left pathway in the movement area to implement the anticlockwise circulation movement.

After the shelf enters the picking waiting area, if the picking workstation is idle, the shelf enters the picking workstation for a picking operator or device to pick merchandise. After the picking is completed, the shelf leaves the picking workstation and moves to the returning waiting area, moves in a direction towards the movement area, and finally returns to the movement area.

In an embodiment of this specification, the determining a merchandise picking time of a merchandise in a warehouse includes the following steps.

Sub-step S11, obtain a moving speed of a shelf on which the merchandise is located and a picking speed of the merchandise.

Sub-step S12, determine/calculating the merchandise picking time of the merchandise according to the moving speed of the shelf and the picking speed of the merchandise.

In this embodiment of this specification, a time (a merchandise picking time) that a shelf moves to the picking workstation and picking starts may be estimated according to a moving speed of the shelf in the warehouse and a speed (a picking speed) of a picking operator that picks the merchandise.

In the automatic high-density warehouse system, a moving speed of a shelf is preset and constant, and a speed of a picking operator or device for picking merchandise may be calculated according to actual operation data. A time for starting picking merchandise on each shelf may be estimated based on such data, to obtain a time (a merchandise picking time) for starting picking each type of merchandise on the shelf.

Step 102, determine an order picking time of each order according to the merchandise picking time of each order.

In an embodiment of this specification, step 102 may include the following sub-steps.

Sub-step S21, obtain merchandise picking times of merchandises in each order.

In an actual application, there may be a plurality of types of merchandise in each order. Then, only after all the merchandises are picked, picking for the order is considered as being completed. Therefore, the order picking time means that picking of all the merchandises in the order is completed, which needs to consider a merchandise picking time of each type of merchandise in the order.

If merchandises in an order are stored on only one shelf, a time for starting picking the merchandises on the shelf may be used as a merchandise picking time of the merchandise. In an embodiment of this specification, sub-step S21 may include the following sub-steps.

Sub-step S21-11, obtain, when the order includes merchandises stored on a plurality of shelves, a plurality of merchandise picking times of the merchandises.

Sub-step S21-12, compare the plurality of merchandise picking times of the merchandises, and select an earliest merchandise picking time of the merchandises.

Sub-step S21-13, use the earliest merchandise picking time as the merchandise picking time of the merchandises in the order.

In an actual application, when a merchandise in an order are stored on a plurality of shelves, a plurality of times for starting picking the merchandise may be obtained. By comparing the plurality of times for starting picking the merchandise, an earliest time for starting picking the merchandise is obtained and used as a merchandise picking time of the merchandise.

In another embodiment of this specification, sub-step S21 may include the following sub-steps.

Sub-step S21-21, obtain, when the order includes merchandises stored on a plurality of shelves, a plurality of merchandise picking times of the merchandises.

Sub-step S21-22, calculate an average merchandise picking time of a merchandise by using the plurality of merchandise picking times of the merchandise.

Sub-step S21-23, use the average merchandise picking time as the merchandise picking time of the merchandise.

In an actual application, when merchandises are stored on a plurality of shelves, in addition to using an earliest time for starting picking a merchandise as a time for starting picking the merchandise to improve order picking efficiency, calculation of an average value of times for starting picking a merchandise or other calculations may be used as the time for starting picking the merchandise. The embodiments of this specification are not limited herein.

Sub-step S22, compare the merchandise picking times, and select a latest merchandise picking time of the merchandises in the order.

Sub-step S23, use the latest merchandise picking time as the order picking time of the order.

In this embodiment of this specification, according to a time for starting picking each type of merchandise in each order, a latest time when a merchandise in the order starts to be picked may be calculated, that is, a time when all merchandises in the order start to be picked.

For example, a time for starting picking each type of merchandise ($I_{ij}$, a jth type of merchandise in an ith order) in each order ($O_i$) may be calculated. If a type of merchandise is stored on a plurality of shelves, the merchandise corresponds to a plurality of times for starting picking the merchandise, and an earliest time for starting picking the merchandise may be used. The time may be represented by $t_{ij}$.

According to the time for starting picking each type of merchandise in each order, a latest time when merchandises in the order start to be picked may be calculated. That is, for each order $O_i$, $T_i=\max\{t_{ij}\}$.

In addition to calculating and using the latest merchandise picking time of the merchandises in the order as the order picking time, other calculations may be used. The embodiments of this specification are not limited herein.

Step 103, determine an order set according to the order picking time of each order, and select one or more orders from the order set as one or more target orders.

In an embodiment of this specification, step 103 may include the following sub-steps.

Sub-step S31, obtain a plurality of orders that are available for picking within a specified time range as candidate orders according to the order picking times.

Sub-step S32, extend the specified time range when a quantity of candidate orders is less than a preset minimum order quantity, and return to the sub-step 31, for obtaining, according to the order picking times, target orders that are available for picking within the extended specified time range.

Sub-step S33, select, when the quantity of the candidate orders is greater than a preset maximum order quantity, one or more orders from the candidate orders as one or more target orders.

Sub-step S34, select, when the quantity of the candidate orders is greater than or equal to the preset minimum order quantity and less than or equal to the preset maximum order quantity, one or more orders from the candidate orders as one or more target orders.

In this embodiment of this specification, according to a time when all merchandises in each order start to be picked, orders that all merchandises thereof may start to be picked within a future time range are selected to obtain a candidate order set.

In this embodiment of this specification, orders delivered each time are controlled. Because it takes a long time for all shelves to complete rotation of one period, orders that need to be delivered in a current time period are dynamically calculated each time. Herein, the time period is controlled by a time range T. If the time period is too short, a quantity of orders (target orders) that can be delivered each time is very small. If the time period is too long, a quantity of delivered orders is very large, and no order may be delivered subsequently, resulting in unstable operation rhythm.

Orders that all merchandises thereof may start to be picked within a future time range T are selected, that is, orders with $T_i \leq T$ are selected to obtain a candidate order set. If a quantity of orders in the candidate order set is less than a minimum quantity $N_{min}$ of orders delivered each time, the time range T is extended, and selecting is performed again until a quantity of orders in an obtained candidate order set is greater than or equal to $N_{min}$.

If the quantity of orders in the candidate order set does not exceed a maximum quantity of orders that can be delivered each time but exceeds the minimum quantity of orders that can be delivered each time, the orders within the time range T may be used as to-be-delivered orders.

If the quantity of orders in the candidate order set exceeds the maximum quantity of orders (target orders) that can be delivered each time, the orders are ranked to screen out to-be-delivered orders from the candidate orders. In an embodiment of this specification, sub-step S33 may include the following sub-steps.

Sub-step S33-11, obtain an earliest merchandise picking time of merchandises in each of the candidate orders and a latest picking time of merchandises in each of the candidate orders.

Sub-step S33-12, calculate, according to a preset rule, an order processing time of each candidate order by using the earliest merchandise picking time and the latest picking time of each candidate order.

Sub-step S33-13, rank the order processing times of the candidate orders to obtain a ranking result.

Sub-step S33-14, select one or more orders from the candidate orders as one or more target orders according to the ranking result.

A ranking principle is to comprehensively consider an earliest time when merchandises in an order may start to be picked, and a difference between a latest time when merchandises may start to be picked and the earliest time when merchandises may start to be picked. If an earliest time when merchandises in an order may start to be picked is early, or a difference between a latest time when merchandises may start to be picked and the earliest time when merchandises may start to be picked is small, the order is ranked high. After ranking is completed, a plurality of orders that are ranked higher are selected, and these orders are used as to-be-delivered orders, namely, the target orders.

Step 104, obtain merchandise status of merchandises in the target orders, and determine target shelves of the merchandises according to the merchandise status. The merchandise status of a merchandise refers to whether the merchandise is stored on a same shelf or on a plurality of shelves.

In an embodiment of this specification, step 104 may include the following sub-steps.

Sub-step S41, when the merchandises in the target order are stored on one shelf, use the shelf as the target shelf of the merchandises.

In another embodiment of this specification, step 104 may include the following sub-steps.

Sub-step S51, obtain a storage quantity of a merchandise in the target orders on each shelf when the merchandise is stored on a plurality of shelves.

Sub-step S52, count a required quantity of the merchandise in the target orders.

Sub-step S53, use a shelf with a storage quantity greater than or equal to the required quantity as a candidate shelf.

Sub-step S54, determine whether a picking task of the merchandise is allocated to the candidate shelf. If the picking task of the merchandise is allocated to the candidate shelf, proceed to sub-step S55.

Sub-step S55, determine whether there is only one candidate shelf allocated the picking task of the merchandise. If there is only one candidate shelf allocated the picking task of the merchandise, proceed to sub-step S56.

Sub-step S56, use the candidate shelf as the target shelf. If there are a plurality of candidate shelves allocated the picking task of the merchandise, proceed to sub-step S57.

Sub-step S57, determine whether other merchandises in the target orders in which the merchandise is located are allocated picking tasks. If the other merchandises in the target orders in which the merchandise is located are allocated the picking tasks, proceed to sub-step S58.

Sub-step S58, collect statistics on estimated picking times of the other merchandises.

Sub-step S59, determine the target shelf from the candidate shelves according to the estimated picking times. If the other merchandises in the target orders in which the merchandise is located are allocated no picking task, proceed to sub-step S510.

Sub-step S510, select a candidate shelf on which the merchandise has an earliest merchandise picking time as the target shelf.

For example, in this embodiment, shelves storing a required picking quantity of one or more merchandises are determined to obtain a shelf set $Q_{ij}$, wherein $Q_{ij}$ represents the shelf set meeting the foregoing condition for a jth type of merchandise in an ith order, such as the candidate shelves.

For each shelf $q_{ij}$ in $Q_{ij}$, whether the shelf has been allocated a picking task of merchandise of the same type is determined. For example, if the jth type of merchandise in the ith order is a 500 ml cola, whether the shelf has been allocated a picking task of a 500 ml cola is determined.

A shelf has been allocated a picking task of merchandise of the same type (i.e., a first merchandise) is determined. If there are a plurality of shelves allocated a picking task of merchandise of the same type, estimated picking times of other merchandises has been allocated a picking task are calculated to obtain a time range $[l_{ij}, r_{ij}]$, wherein the other merchandises and the first merchandise are in the same orders. Then, a shelf, on which the merchandise has a time that the merchandise can start to be picked within the time range or being closest to the time range, is selected as a target shelf. If no other merchandises in the orders to which the merchandise belongs is allocated to a shelf, or a plurality of shelves has times for starting picking that are within the time range $[l_{ij}, r_{ij}]$, a shelf with an earliest time for starting picking is selected as a target shelf.

If no shelf is allocated a picking task of the merchandise of the same type, estimated picking times of other allocated merchandises in the orders to which the merchandise belongs are calculated to obtain an estimated picking time range $[l_{ij}, r_{ij}]$ of the allocated merchandises. A shelf, with a time for starting picking merchandises within the time range or being closest to the time range, is selected as a target shelf. If no other merchandises in the orders to which the merchandise belongs is allocated to shelf, or a plurality of shelves has times for starting picking that are within the time range, a shelf with an earliest time for starting picking is selected as a target shelf.

Step 105, allocate a picking task of the merchandise to the target shelf.

After the target shelf of the merchandise is determined, the picking task of the merchandise is allocated to the target shelf and a picking workstation corresponding to the target shelf. In an embodiment of this embodiment, after allocating a picking task of the merchandise to the target shelf, that is, after step 105, the method may further include the following steps: determining the corresponding picking workstation according to the target shelf allocated to the merchandise; and moving the target shelf to the corresponding picking workstation to execute the picking task of the merchandise.

The target shelf associated with the merchandise is moved to the corresponding picking workstation to execute the picking task of the merchandise. Merchandises in an order may be picked from different shelves at different picking workstations corresponding to the shelves. After picking is completed, the merchandises in the same order need to be placed together at a Rebin workstation, and then operations such as packaging and departing the warehouse are performed.

In this embodiment of this specification, merchandise picking time of each merchandise is determined in a warehouse. Target orders that can be processed are determined based on the merchandise picking time of each merchandise, and a picking task of the merchandise in the target orders is allocated to corresponding shelves according to a merchandise status of the merchandise. In this embodiment of this specification, a proper shelf can be allocated according to the merchandise status of the merchandise, to improve the order picking efficiency.

Figure 3:
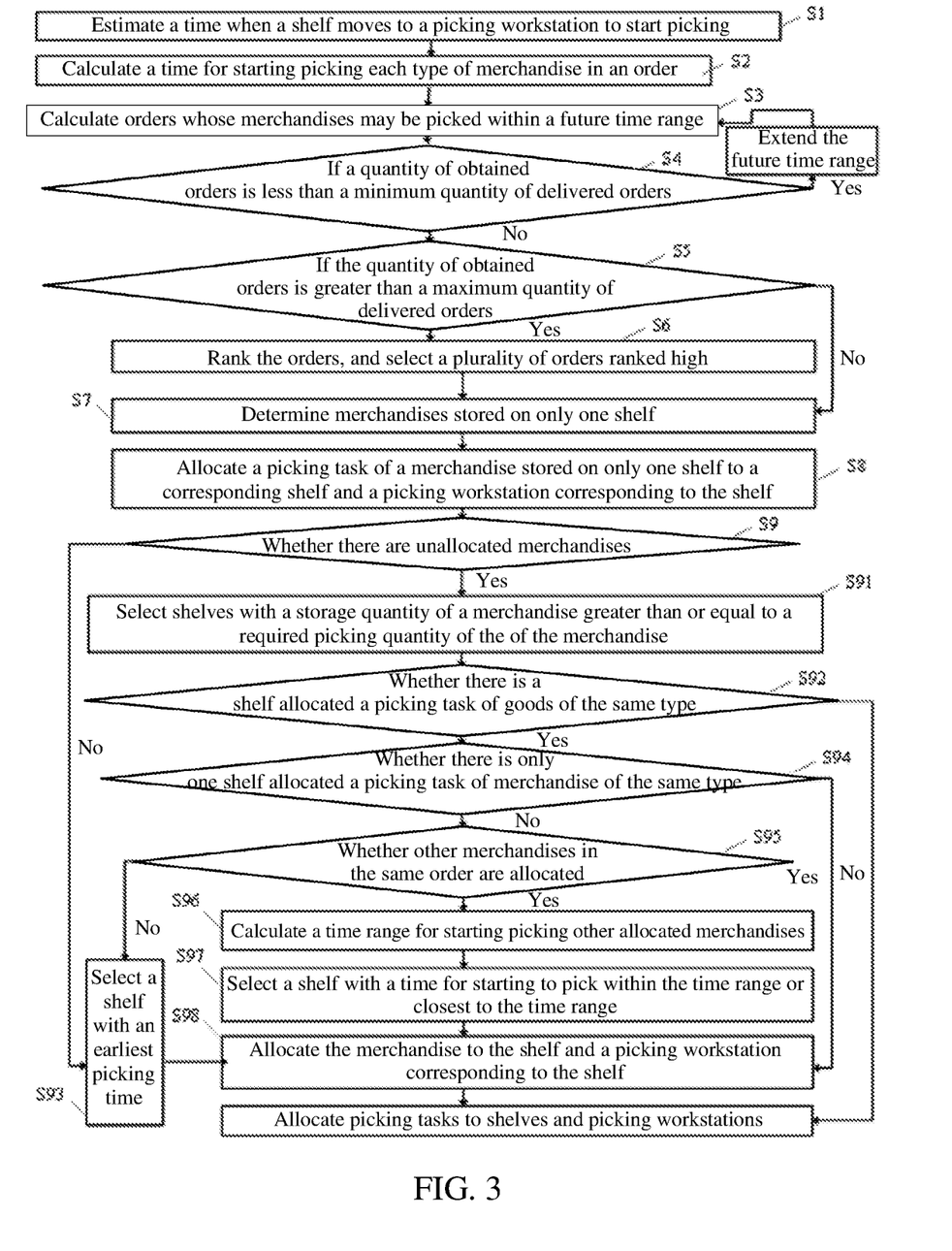
FIG. 3 is a flowchart of a process of an automatic high-density warehouse, according to some embodiments of this specification.

To enable a person skilled in the art to better understand the embodiments of this specification, the following describes, using a specific example, a process of picking merchandises in a high-density warehouse according to an embodiment of this specification. FIG. 3 is a flowchart of a process of an automatic high-density warehouse, according to an embodiment of this specification. The process includes the following steps.

S1, estimate, according to a moving speed of a shelf on which merchandises are located and a picking speed of the merchandises, a time when a shelf moves to a picking workstation to start picking. In an automatic high-density warehouse system in this embodiment of this specification, a moving speed of a shelf is preset and constant, and a picking speed (that is, a merchandise picking time) of a picking operator or device for picking the merchandise may be calculated according to actual operation data. A time for starting picking from each shelf may be estimated based on such data, to obtain a time for starting picking each type of merchandises on the shelf.

S2, calculate a time for starting picking each type of merchandise ($I_{ij}$, indicating a jth type of merchandise in an ith order) in each order ($O_i$). If a type of merchandise is stored on a plurality of shelves, the merchandise corresponds to a plurality of times for starting picking, and calculation of an earliest time for starting picking, calculation of an average value of the times for starting picking may be used as a time for starting picking the merchandise, or other calculation methods may be used. The time for starting picking may be represented by $t_{ij}$. According to the time for starting picking each type of merchandise in each order, a latest time when merchandises in the order may start to be picked is calculated. That is, for each order $O_i$, $T_i=\max\{t_{ij}\}$.

S3, calculate orders whose merchandises may start to be picked within a future time range T, that is, determine orders with $T_i \leq T$ to obtain a candidate order set.

S4, if a quantity of orders in the candidate order set is less than a minimum quantity $N_{min}$ of orders delivered each time, extend the time range T, and perform the calculation again until a quantity of obtained orders in the candidate order sets is greater than or equal to $N_{min}$. Then proceed to step S5.

S5, if the quantity of orders in the candidate order set is greater than a maximum quantity $N_{max}$ of orders delivered each time, proceed to S6. If the quantity of orders in the candidate order set is not greater than the maximum quantity $N_{max}$ of orders delivered once, proceed to S7.

S6, rank the orders. First, for each order, $s_i=\min\{t_{ij}\}+\alpha(\max\{t_{ij}\}-\min\{t_{ij}\})$ is calculated. $\alpha$ is a coefficient. Then, the orders are ranked in ascending order according to $s_i$, and the $N_{max}$ orders ranked higher are selected as target orders.

S7, determine merchandises stored on only one shelf in a to-be-delivered order.

S8, allocate a picking task of a merchandise stored on only one shelf to a corresponding shelf and a picking workstation corresponding to the shelf.

S9, determine whether the order includes merchandises not allocated picking tasks. If the merchandises are stored on a plurality of shelves, perform selection for each type of the merchandises according to the following method, proceed to the following steps.

S91, select shelves with a storage quantity of a merchandise greater than or equal to a required picking quantity of the merchandise, to obtain a shelf set.

S92, determine, for each shelf in the shelf set, whether the shelf includes merchandise of the same type. If the shelf does not include merchandise of the same type, proceed to S93. If the shelf includes merchandise of the same type, proceed to S94.

S93, select a shelf with an earliest picking time, and proceed to S98.

S94, determine whether there is only one shelf allocated a picking task of merchandise of the same type. If there is only one shelf allocated a picking task of merchandise of the same type, proceed to S93. If there are a plurality of shelves allocated a picking task of merchandise of the same type, proceed to S95.

S95, determine whether other merchandises in the same order to which the merchandise belongs are allocated. If the other merchandises in the same order to which the merchandise belongs have not been allocated, proceed to S93. If the other merchandises in the same order to which the merchandise belongs are allocated, perform S96.

S96, calculate a time range for starting picking the other allocated merchandises.

S97, select a shelf with a time for starting picking within the time range or closest to the time range.

S98, allocate the merchandise to the shelf and a picking workstation corresponding to the shelf.

S99, allocate picking tasks to shelves and picking workstations.

After the above processing, picking tasks of all types of merchandises in a to-be-delivered order (a target order) are delivered to shelves and picking workstations corresponding to the shelves. After the picking is completed, the merchandises in the same order are placed together, and operations such as packaging and departing the warehouse are performed.

It should be noted that the foregoing method embodiment is described as a series of combinations of actions for brief description. A person skilled in the art knows that some steps may be performed in other sequences or simultaneously according to the embodiments of this specification, which are not limited herein. In addition, a person skilled in the art also knows that the embodiments described in the specification are exemplary. An action described herein may not be mandatory in the embodiments of this specification.

Figure 4:
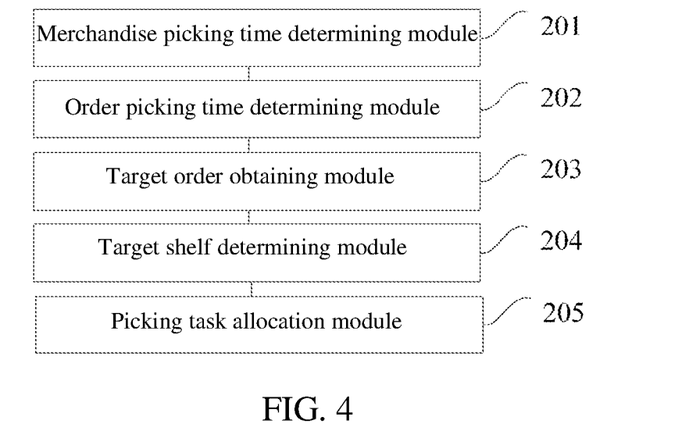
FIG. 4 is a block diagram of a task allocation apparatus for picking merchandises, according to some embodiments of this specification.

FIG. 4 is a block diagram of a task allocation apparatus for picking merchandises, according to an embodiment of this specification. Merchandises are stored on a shelf of a warehouse. The task allocation apparatus for picking merchandises may include the following modules: a merchandise picking time determining module 201, configured to determine merchandise picking times of the merchandises in the warehouse; an order picking time determining module 202, configured to determine an order picking time of each order according to the merchandise picking times; a target order obtaining module 203, configured to determine a corresponding order set according to the order picking times, and select one or more orders from the order set as one or more target orders; a target shelf determining module 204, configured to obtain merchandise status of merchandises in the target orders, and determine target shelves of the merchandises according to the merchandise status; and a picking task allocation module 205, configured to allocate picking tasks of the merchandises to the target shelves.

In an embodiment of this specification, the merchandise picking time determining module 201 may include the following submodules: a speed data obtaining submodule, configured to obtain a moving speed of the shelf on which the merchandise is located and a picking speed of the merchandise; and a merchandise picking time determining submodule, configured to determine the merchandise picking time of the merchandise according to the moving speed and the picking speed.

In an embodiment of this specification, the order picking time determining module 202 may include the following submodules: a merchandise picking time obtaining submodule, configured to obtain merchandise picking times of merchandises in the order; a merchandise picking time comparison submodule, configured to compare the merchandise picking times, and determine a latest merchandise picking time of the merchandises in the order; and an order picking time determining submodule, configured to use the latest merchandise picking time as the order picking time of the order.

In an embodiment of this specification, the merchandise picking time obtaining submodule may include the following units: a unit for obtaining a plurality of merchandise picking times, configured to obtain, when the order includes merchandises stored on a plurality of shelves, a plurality of merchandise picking times of the merchandises; an earliest merchandise picking time screening unit, configured to compare the plurality of merchandise picking times of the merchandises, and determine an earliest merchandise picking time of the merchandises; and a merchandise picking time determining unit, configured to use the earliest merchandise picking time as the merchandise picking time of the merchandises.

In an embodiment of this specification, the merchandise picking time obtaining submodule may include the following units: a unit for obtaining a plurality of merchandise picking times, configured to obtain, when the order includes merchandises stored on a plurality of shelves, a plurality of merchandise picking times of the merchandises; an average merchandise picking time calculation unit, configured to calculate an average merchandise picking time of the merchandises by using the plurality of merchandise picking times of the merchandises; and a merchandise picking time determining unit, configured to use the average merchandise picking time as the merchandise picking time of the merchandises.

In an embodiment of this specification, the target order obtaining module 203 may include the following submodules: a candidate order obtaining submodule, configured to obtain orders available for being picked within a specified time range as candidate orders according to the order picking time; a first processing submodule, configured to extend, when a quantity of candidate orders is less than a preset minimum order quantity, the specified time range, and invoke the candidate order obtaining submodule to obtain orders available for being picked within the extended specified time range as the candidate orders; a second processing submodule, configured to select, when the quantity of candidate orders is greater than a preset maximum order quantity, one or more orders from the candidate orders as one or more target orders; and a third processing submodule, configured to select, when the quantity of candidate orders is greater than or equal to the preset minimum order quantity and less than or equal to the preset maximum order quantity, one or more orders from the candidate orders as the one or more target order.

In an embodiment of this specification, the second processing submodule may include the following units: a picking time obtaining unit, configured to obtain earliest merchandise picking times of merchandises in the candidate orders and latest picking times of merchandises in the candidate orders; an order processing time calculation unit, configured to calculate, according to a preset rule, order processing times using the earliest merchandise picking times and the latest picking times; a ranking unit, configured to rank the order processing times of the candidate orders to obtain a ranking result; and a target order screening unit, configured to select one or more orders from the candidate orders as the target orders according to the ranking result.

In an embodiment of this specification, the target shelf determining module 204 may include the following submodules: a target obtaining determining submodule, configured to use, when merchandises in the target orders are stored on one shelf, the one shelf as the target shelf of the merchandises.

In an embodiment of this specification, the target shelf determining module 204 may include the following submodules: a storage quantity obtaining submodule, configured to obtain a storage quantity of a merchandise in the candidate orders on each shelf when the merchandise in the candidate orders is stored on a plurality of shelves; a required picking quantity counting submodule, configured to count a required picking quantity of the merchandise in the candidate orders; a candidate shelf determining submodule, configured to use a shelf with a storage quantity greater than or equal to the required picking quantity as a candidate shelf; a picking task judgment submodule, configured to determine whether a picking task of the merchandise is allocated to the candidate shelf; a candidate shelf quantity judgment submodule, configured to: if the picking task of the merchandise is allocated to the candidate shelf, determine whether there is only one candidate shelf allocated the picking task of the merchandise; a first target shelf determining submodule, configured to: if there is only one candidate shelf allocated the picking task of the merchandise, use the candidate shelf as the target shelf; a picking task judgment submodule, configured to: if there are a plurality of candidate shelves allocated the picking task of the merchandise, determine whether other merchandises in the same order in which the merchandise are located are allocated a picking task; a submodule for collecting statistics on estimated picking times, configured to: if the other merchandises in the order in which the merchandise is located are allocated a picking task, collect statistics on estimated picking times of the other merchandises; a second target shelf determining submodule, configured to determine a target shelf from the candidate shelves according to the estimated picking times; and an earliest merchandise picking time screening submodule, configured to: if the other merchandises in the same order in which the merchandise is located are not allocated picking task, select a candidate shelf from which the merchandises are picked at the earliest time as the target shelf.

In an embodiment of this specification, the device may further include the following modules: a picking workstation determining module, configured to determine a corresponding picking workstation according to the target shelf allocated to the merchandise; and a picking task execution module, configured to move the target shelf to the corresponding picking workstation to execute the picking task of the merchandise.

A device embodiment is described briefly since it is similar to a method embodiment. For related parts, reference may be made to the corresponding portions of the descriptions in the method embodiment.

An embodiment of this specification further provides a device, including: one or more processors; and one or more machine-readable media storing instructions, when executed by the one or more processors, causing the device to perform operations of the method according to the embodiments of this specification.

An embodiment of this specification further discloses one or more machine-readable media storing instructions, when executed by one or more processors, causing a device to perform operations of the method according to the embodiments of this specification.

It should be noted that the embodiments in this specification are all described in a progressive manner. Description of each of the embodiments focuses on differences from other embodiments, and reference may be made to each other for the same or similar parts among respective embodiments.

Persons skilled in the art should understand that, the embodiments of this specification may be provided as methods, apparatuses, or computer program products. Therefore, the embodiments of this specification may be in a form of hardware only embodiments, software only embodiments, or embodiments with a combination of software and hardware. Moreover, the embodiments of this specification may be in a form of a computer program product that is implemented on one or more computer-usable storage media (including but not limited to a disk memory, a CD-ROM, an optical memory, and the like) that include computer-usable program code.

In a typical configuration, the computer device includes one or more processors (CPU), an input/output interface, a network interface, and a memory. The memory may include forms of a volatile memory, a random access memory (RAM), and/or a non-volatile memory in computer readable media, such as a read-only memory (ROM) or a flash RAM. The memory is an example of a computer readable medium. The computer readable media include persistent and non-persistent, and mobile and non-mobile media, and information storage may be implemented by using any method or technology. The information may be a computer readable instruction, a data structure, a program module, or other data. For example, computer storage media include, but are not limited to, a phase change memory (PRAM), a static RAM (SRAM), a dynamic RAM (DRAM), other types of random access memories (RAM), a ROM, an electrically erasable programmable ROM (EEPROM), a flash memory or other memory technologies, a compact disc ROM (CD-ROM), a digital versatile disc (DVD) or other optical storage, a cassette-type tape, a magnetic tape, a disk storage or other magnetic storage devices or any other non-transmission media, and can be used to store information that can be accessed by a computing device. According to the definitions in this specification, the computer readable media do not include non-persistent computer readable media (transitory media), such as a modulated data signal and carrier.

The embodiments of this specification are described with reference to the flowcharts and/or block diagrams of a method, a device (system), and computer program products of the embodiments of this specification. It should be understood that computer program instructions may be used to implement each process and/or each block in the flowcharts and/or block diagrams and a combination of a process and/or a block in the flowcharts and/or the block diagrams. These computer program instructions may be provided for a general-purpose computer, a dedicated computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored on a computer-readable memory that can instruct the computer or any other programmable data processing terminal device to work in a specific manner, so that the instructions stored on the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing terminal device, so that a series of operations and steps are performed on the computer or the other programmable terminal devices, thereby generating computer-implemented processing. Therefore, the instructions executed on the computer or the another programmable terminal device provide steps for implementing a specific function in one or more processes in the flowcharts and/or in one or more blocks in the block diagrams.

A person skilled in the art can make changes and modifications to the embodiments described this specification, once they learn of the basic inventive concept. Therefore, the following claims cover the embodiments, and all changes and modifications thereof fall within the scope of the embodiments of this specification.

Finally, it should be noted that in this specification, relational terms such as first and second are only used to distinguish one entity or operation from another, and do not necessarily require or imply that any actual relationship or sequence exists between these entities or operations. Moreover, the terms "include," "comprise," or their any other variant are intended to cover a non-exclusive inclusion, so that a process, a method, goods, or a terminal device that includes a list of elements not only includes those elements but also includes other elements that are not expressly listed, or further includes elements inherent to such a process, method, goods, or terminal device. An element preceded by "includes a . . . " does not, without more constraints, preclude the existence of additional identical elements in the process, method, goods, or terminal device that includes the element.

The task allocation method and the task allocation apparatus for picking merchandises provided in the embodiments of this specification are described in detail above. The principle and implementations of embodiments of this specification are described herein using specific examples. The descriptions of the foregoing embodiments are merely for helping understand the method and core ideas of this specification. In addition, a person skilled in the art can make variations to this specification in terms of the specific implementations and application scopes according to the ideas of this specification. Therefore, the content of this specification shall not be construed as a limitation on this specification.

What is claimed is:

1. A task allocation method for picking merchandises, wherein the merchandises are stored on shelves of a warehouse, and the method comprises:
   receiving, by a computing device, a plurality of orders of merchandises;
   determining, by the computing device, a merchandise picking time of each merchandise of the merchandises of the received orders;
   determining, by the computing device, an order picking time for each of the received orders according to the merchandise picking time of each of the merchandises;
   determining, by the computing device, an order set according to the order picking time for each of the received orders, and selecting one or more orders from the order set as one or more target orders;
   locating, by the computing device, one or more shelves on which merchandises in the one or more target orders are stored in the warehouse;
   obtaining, by the computing device, merchandise status of the merchandises in the one or more target orders, and determining a target shelf according to the merchandise status;
   allocating, by the computing device, a picking task of the merchandises to the target shelf;
   determining, by the computing device, a picking workstation corresponding to the target shelf;
   instructing, by the computing device when the picking workstation is available, the target shelf to move to the picking workstation to execute the picking task of the merchandises; and
   instructing, by the computing device, the target shelf to leave the corresponding picking workstation after the picking task of the merchandise is completed.

2. The method according to claim 1, wherein the determining a merchandise picking time of each merchandise of the merchandises comprises:
   obtaining a moving speed of the shelf on which the merchandise is located and a picking speed of the merchandise; and
   calculating the merchandise picking time of the merchandise according to the moving speed of the shelf and the picking speed of the merchandise.

3. The method according to claim 1, wherein the determining an order picking time for each of the received orders according to the merchandise picking time of each of the merchandises comprises:
   obtaining merchandise picking times for merchandises in each order;
   comparing the obtained merchandise picking times; and
   determining a latest merchandise picking time of the merchandises in each order as the order picking time of each order.

4. The method according to claim 1, wherein the determining a merchandise picking time of each merchandise comprises:
   obtaining, when the merchandise is stored on a plurality of shelves, a plurality of merchandise picking times associated with the merchandise;
   comparing the plurality of merchandise picking times; and
   determining an earliest merchandise picking time associated with the merchandise as the merchandise picking time of the merchandise.

5. The method according to claim 1, wherein the determining a merchandise picking time of each merchandise comprises:
   obtaining, when the merchandise is stored on a plurality of shelves, a plurality of merchandise picking times associated with the merchandise;
   calculating an average merchandise picking time of the merchandise using the plurality of merchandise picking times; and
   using the average merchandise picking time as the merchandise picking time of the merchandise.

6. The method according to claim 1, wherein the determining an order set according to the order picking time for each of the received orders, and selecting one or more orders from the order set as one or more target orders comprise:
   obtaining a plurality of orders that are available for picking within a first time range as candidate orders;
   extending the first time range to a second time range when a quantity of the candidate orders is less than a minimum order quantity, and obtaining a plurality of orders that are available for picking within the second time range as the candidate orders; and
   selecting, when the quantity of candidate orders is greater than or equal to the minimum order quantity, one or more orders from the candidate orders as the one or more target orders.

7. The method according to claim 6, wherein the selecting one or more orders from the candidate orders as the one or more target orders comprises:
   obtaining an earliest merchandise picking time of merchandises in each of the candidate orders and a latest merchandise picking time of merchandises in each of the candidate orders;
   calculating, according to a rule, order processing times of the candidate orders according to the earliest merchandise picking time and the latest merchandise picking time of each of the candidate orders;

ranking the order processing times of the candidate orders to obtain a ranking result; and selecting one or more orders from the candidate orders as the one or more target orders according to the ranking result.

8. The method according to claim 1, wherein the obtaining merchandise status of the merchandises in the one or more target orders, and determining a target shelf according to the merchandise status comprise:

determining, when the merchandises in the one or more target orders are stored on a same shelf, the same shelf as the target shelf.

9. The method according to claim 1, wherein the obtaining merchandise status of the merchandises in the one or more target orders, and determining a target shelf according to the merchandise status comprises:

obtaining a storage quantity of a first merchandise in the one or more target orders on each shelf when the first merchandise is stored on a plurality of shelves;

counting a required quantity of the first merchandise in the one or more target orders;

using a plurality of shelves having a storage quantity of the first merchandise that is greater than or equal to the required quantity as candidate shelves;

determining whether each of the candidate shelves has been allocated a picking task of the first merchandise;

if the picking task of the first merchandise is allocated to at least one of the candidate shelves, determining whether only one of the candidate shelves is allocated the picking task of the first merchandise;

if only one of the candidate shelves is allocated the picking task of the first merchandise, determining the one candidate shelf as the target shelf;

if more than one of the candidate shelves are each allocated a picking task of the first merchandise, determining whether one or more other merchandises in the one or more target orders are allocated to one or more picking tasks;

if a second merchandise of the one or more other merchandises is allocated to a picking task, calculating an estimated picking time of the second merchandise;

determining the target shelf from the candidate shelves according to the estimated picking time; and if the one or more other merchandises are not allocated to one or more picking tasks, selecting a candidate shelf on which the first merchandise has an earliest merchandise picking time as the target shelf.

10. A task allocation apparatus for picking merchandises, wherein the merchandises are stored on shelves of a warehouse, and the apparatus comprises one or more processors and one or more machine-readable media storing instructions, when executed by the one or more processors, causing the apparatus to perform operations comprise:

receiving a plurality of orders of merchandises;

determining a merchandise picking time of each merchandise of the merchandises of the received orders;

determining an order picking time for each of the received orders according to the merchandise picking time of each of the merchandises;

determining an order set according to the order picking time for each of the received orders, and selecting one or more orders from the order set as one or more target orders;

locating one or more shelves on which merchandises in the one or more target orders are stored in the warehouse;

obtaining merchandise status of the merchandises in the one or more target orders, and determining a target shelf according to the merchandise status;

allocating a picking task of the merchandises to the target shelf;

determining a picking workstation corresponding to the target shelf;

instructing, when the picking workstation is available, the target shelf to move to the picking workstation to execute the picking task of the merchandises; and instructing the target shelf to leave the corresponding picking workstation after the picking task of the merchandise is completed.

11. The apparatus according to claim 10, wherein the determining a merchandise picking time of each merchandise of the merchandises comprises:

obtaining a moving speed of the shelf on which the merchandise is located and a picking speed of the merchandise; and calculating the merchandise picking time of the merchandise according to the moving speed of the shelf and the picking speed of the merchandise.

12. The apparatus according to claim 10, wherein the determining an order picking time for each of the received orders according to the merchandise picking time of each of the merchandises comprises:

obtaining merchandise picking times for merchandises in each order;

comparing the obtained merchandise picking times; and determining a latest merchandise picking time of the merchandises in each order as the order picking time of each order.

13. The apparatus according to claim 10, wherein the determining a merchandise picking time of each merchandise comprises:

obtaining, when the merchandise is stored on a plurality of shelves, a plurality of merchandise picking times associated with the merchandise;

comparing the plurality of merchandise picking times; and determining an earliest merchandise picking time associated with the merchandise as the merchandise picking time of the merchandise.

14. The apparatus according to claim 10, wherein the determining a merchandise picking time of each merchandise comprises:

obtaining, when the merchandise is stored on a plurality of shelves, a plurality of merchandise picking times associated with the merchandise;

calculating an average merchandise picking time of the merchandise using the plurality of merchandise picking times; and using the average merchandise picking time as the merchandise picking time of the merchandise.

15. The apparatus according to claim 10, wherein the determining an order set according to the order picking time for each of the received orders, and selecting one or more orders from the order set as one or more target orders comprise:

obtaining a plurality of orders that are available for picking within a first time range as candidate orders;

extending the first time range to a second time range when a quantity of the candidate orders is less than a minimum order quantity, and obtaining a plurality of orders that are available for picking within the second time range as the candidate orders; and selecting, when the quantity of candidate orders is greater than or equal to the minimum order quantity, one or more orders from the candidate orders as the one or more target orders.

16. The apparatus according to claim 15, wherein the selecting one or more orders from the candidate orders as the one or more target orders comprises:
   obtaining an earliest merchandise picking time of merchandises in each of the candidate orders and a latest merchandise picking time of merchandises in each of the candidate orders;
   calculating, according to a rule, order processing times of the candidate orders according to the earliest merchandise picking time and the latest merchandise picking time of each of the candidate orders;
   ranking the order processing times of the candidate orders to obtain a ranking result; and
   selecting one or more orders from the candidate orders as the one or more target orders according to the ranking result.

17. The apparatus according to claim 10, wherein the obtaining merchandise status of the merchandises in the one or more target orders, and determining a target shelf according to the merchandise status comprise:
   determining, when the merchandises in the one or more target orders are stored on a same shelf, the same shelf as the target shelf.

18. The apparatus according to claim 10, wherein the obtaining merchandise status of the merchandises in the one or more target orders, and determining a target shelf according to the merchandise status comprises:
   obtaining a storage quantity of a first merchandise in the one or more target orders on each shelf when the first merchandise is stored on a plurality of shelves;
   counting a required quantity of the first merchandise in the one or more target orders;
   using a plurality of shelves having a storage quantity of the first merchandise that is greater than or equal to the required quantity as candidate shelves;
   determining whether each of the candidate shelves has been allocated a picking task of the first merchandise;
   if the picking task of the first merchandise is allocated to at least one of the candidate shelves, determining whether only one of the candidate shelves is allocated the picking task of the first merchandise;
   if only one of the candidate shelves is allocated the picking task of the first merchandise, determining the one candidate shelf as the target shelf;
   if more than one of the candidate shelves are each allocated a picking task of the first merchandise, determining whether one or more other merchandises in the one or more target orders are allocated to one or more picking tasks;
   if a second merchandise of the one or more other merchandises is allocated to a picking task, calculating an estimated picking time of the second merchandise;
   determining the target shelf from the candidate shelves according to the estimated picking time; and
   if the one or more other merchandises are not allocated to one or more picking tasks, selecting a candidate shelf on which the first merchandise has an earliest merchandise picking time as the target shelf.

19. A non-transitory computer-readable storage medium for task allocation of picking merchandises, configured with instructions when executed by one or more processors to cause the one or more processors to perform operations comprising:
   receiving a plurality of orders of merchandises;
   determining a merchandise picking time of each merchandise of the merchandises of the received orders;
   determining an order picking time for each of the received orders according to the merchandise picking time of each of the merchandises;
   determining an order set according to the order picking time for each of the received orders, and selecting one or more orders from the order set as one or more target orders;
   locating one or more shelves on which merchandises in the one or more target orders are stored in the warehouse;
   obtaining merchandise status of the merchandises in the one or more target orders, and determining a target shelf according to the merchandise status;
   allocating a picking task of the merchandises to the target shelf;
   determining a picking workstation corresponding to the target shelf;
   instructing, when the picking workstation is available, the target shelf to move to the picking workstation to execute the picking task of the merchandises; and
   instructing the target shelf to leave the corresponding picking workstation after the picking task of the merchandise is completed.

* * * * *

UNITED STATES PATENT AND TRADEMARK OFFICE
CERTIFICATE OF CORRECTION

PATENT NO. : 11,954,638 B2
APPLICATION NO. : 16/951804
DATED : April 9, 2024
INVENTOR(S) : Haoyuan Hu et al.

It is certified that error appears in the above-identified patent and that said Letters Patent is hereby corrected as shown below:

On the Title Page

Item (30) Foreign Application Priority Data "201810508109.9" should read -- 2018105081094 --.

Signed and Sealed this
Fourth Day of June, 2024

Katherine Kelly Vidal
*Director of the United States Patent and Trademark Office*